United States Patent
Koizumi

(10) Patent No.: US 9,457,436 B2
(45) Date of Patent: Oct. 4, 2016

(54) METHOD OF MANUFACTURING A CRYOGENIC REGENERATOR

(71) Applicant: SUMITOMO HEAVY INDUSTRIES, LTD., Tokyo (JP)

(72) Inventor: Tatsuo Koizumi, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 491 days.

(21) Appl. No.: 13/895,489

(22) Filed: May 16, 2013

(65) Prior Publication Data

US 2014/0013775 A1 Jan. 16, 2014

(30) Foreign Application Priority Data

Jul. 11, 2012 (JP) ................................. 2012-155464

(51) Int. Cl.
*B23P 15/26* (2006.01)
*F25B 9/14* (2006.01)

(52) U.S. Cl.
CPC .................. *B23P 15/26* (2013.01); *F25B 9/14* (2013.01); *F25B 2309/003* (2013.01); *F25B 2309/1415* (2013.01); *Y10T 29/49357* (2015.01)

(58) Field of Classification Search
CPC ............ B23P 15/26; B65B 1/04; F25B 9/14; F25B 2309/003; F25B 2309/1415; F25B 2309/1416; F17C 5/04; F17C 5/06; Y10T 137/6416; Y10T 29/49357; Y02E 60/321
See application file for complete search history.

(56) References Cited

U.S. PATENT DOCUMENTS

| | | | | |
|---|---|---|---|---|
| 3,304,999 A | * | 2/1967 | Ward ....................... | F02G 1/057 165/10 |
| 4,359,872 A | * | 11/1982 | Goldowsky ........... | F02G 1/0445 165/10 |
| 7,337,835 B2 | * | 3/2008 | Nigam ..................... | F28D 7/024 165/159 |
| 7,490,635 B2 | | 2/2009 | Grabhorn et al. | |
| 7,874,347 B2 | * | 1/2011 | Chen ....................... | B82Y 10/00 165/104.21 |
| 8,240,050 B2 | * | 8/2012 | Yamada ................. | B21D 53/06 29/890.032 |
| 2004/0231340 A1 | * | 11/2004 | Bin-Nun ................... | F25B 9/14 62/6 |
| 2008/0202629 A1 | * | 8/2008 | Michel ....................... | F17C 5/04 141/5 |
| 2009/0199579 A1 | * | 8/2009 | Kundig .................. | F25J 1/0007 62/115 |

FOREIGN PATENT DOCUMENTS

| | | |
|---|---|---|
| JP | 59-077266 | 5/1984 |
| JP | 62-112072 U | 7/1987 |
| JP | 63-054577 | 3/1988 |
| JP | S63-091463 | 4/1988 |
| JP | S63-204077 | 8/1988 |
| JP | H01-213544 | 8/1989 |
| JP | 2004-076956 | 3/2004 |
| JP | 2007-537397 | 12/2007 |

* cited by examiner

*Primary Examiner* — Sarang Afzali
(74) *Attorney, Agent, or Firm* — IPUSA, PLLC

(57) ABSTRACT

A method of manufacturing a cryogenic regenerator includes the steps of supplying helium gas to a metallic helium gas sealing tube having a front end portion and a rear end portion that are open to replace air within the tube; sealing the rear end portion of the helium gas sealing tube; cooling the helium gas sealing tube and filling additional helium gas into the cooled helium gas sealing tube from a helium gas supplying unit; sealing the front end portion of the helium gas sealing tube after the helium gas sealing tube is filled with the additional helium gas; and winding the helium gas sealing tube into a coil structure around a core material to fabricate a helium gas sealing tube wound structure.

3 Claims, 9 Drawing Sheets

METHOD OF MANUFACTURING A CRYOGENIC REGENERATOR

CROSS-REFERENCE TO RELATED APPLICATIONS

The present application is based on and claims the benefit of priority to Japanese Patent Application No. 2012-155464, filed on Jul. 11, 2012, the entire contents of which are incorporated herein by reference.

BACKGROUND OF THE INVENTION

1. Field of the Invention

The present invention relates to a cryogenic regenerator that uses helium gas as a regenerator material and a method of manufacturing such a cryogenic regenerator.

2. Description of the Related Art

In general, Gifford-McMahon (GM) cryocoolers, pulse tube cryocoolers, Stirling cryocoolers, and Solvay cryocoolers, for example, are known as cryocoolers that include regenerators. The regenerators included in these cryocoolers are configured to cool refrigerant gas that flows toward an expansion chamber, for example, and accumulate cold generated by the refrigerant gas when the refrigerant gas passes through the regenerator. That is, by including a regenerator, the cooling effect of the cryocoolers may be improved.

In a case where a cryogenic temperature of less than or equal to 30 K, for example, has to be generated at the cryocooler, selecting a regenerator material that has high specific heat (volume specific heat) at this temperature may contribute to improvement of the cooling effect.

For example, the regenerator disclosed in Japanese Unexamined Patent Publication No. 63-054577 has a band-like hollow structure wound around a regenerator body that is configured to have helium gas sealed therein. One end of the band-like hollow structure is sealed, and the other end of the band-like hollow structure is connected to a buffer tank that has a capacity of about 500-1000 times the capacity of the band-like hollow structure and is filled with helium gas. In this way, the disclosed regenerator is configured to retain the pressure of helium gas under a cryogenic temperature.

SUMMARY OF THE INVENTION

According to one embodiment of the present invention, a method of manufacturing a cryogenic regenerator includes the steps of supplying helium gas to a helium gas sealing tube having a front end portion and a rear end portion that are open; sealing the rear end portion of the helium gas sealing tube; cooling the helium gas sealing tube and filling the helium gas into the cooled helium gas sealing tube from a helium gas supplying unit; and sealing the front end portion of the helium gas sealing tube after the helium gas sealing tube is filled with the helium gas.

According to another embodiment of the present invention, a cryogenic regenerator that uses helium gas as a regenerator material includes a core material and a helium gas sealing tube into which the helium gas is filled and sealed by sealing two end portions of the helium gas sealing tube. The helium gas sealing tube is wound around the core material into a coil structure.

DETAILED DESCRIPTION OF THE PREFERRED EMBODIMENTS

The above regenerator using a buffer tank to retain the pressure of helium gas requires the buffer tank, which is quite large in volume. Thus, the structure of the cryocooler using such a regenerator may be complicated, and manufacturing the cryocooler may be cumbersome. Also, the above regenerator cannot be used in certain practical applications such as GM cryocoolers that are arranged to accommodate a regenerator material within a displacer, for example.

According to an aspect of the present invention, a cryogenic regenerator manufacturing method is provided for enabling helium gas to be easily supplied to a helium gas sealing tube.

According to another aspect of the present invention, a cryogenic regenerator is provided that uses helium gas as a regenerator material without using a buffer tank to retain helium pressure so that the cryogenic regenerator may be reduced in size.

In the following, embodiments of the present invention are described with reference to the accompanying drawings.

Figure 1B:
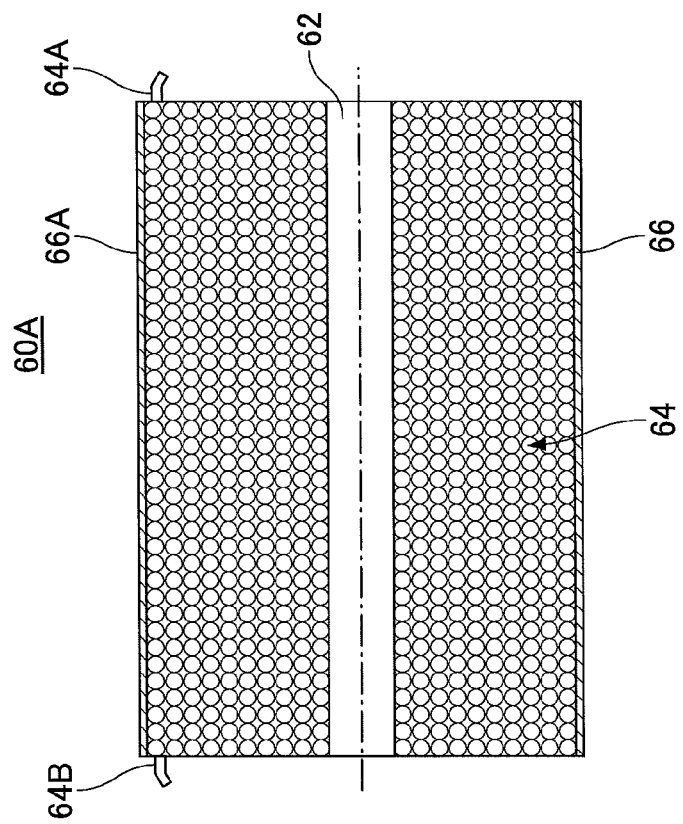
FIG. 1A is a side view and FIG. 1B is a cross-sectional view of a regenerator according to an embodiment of the present invention.
Figure 1A:
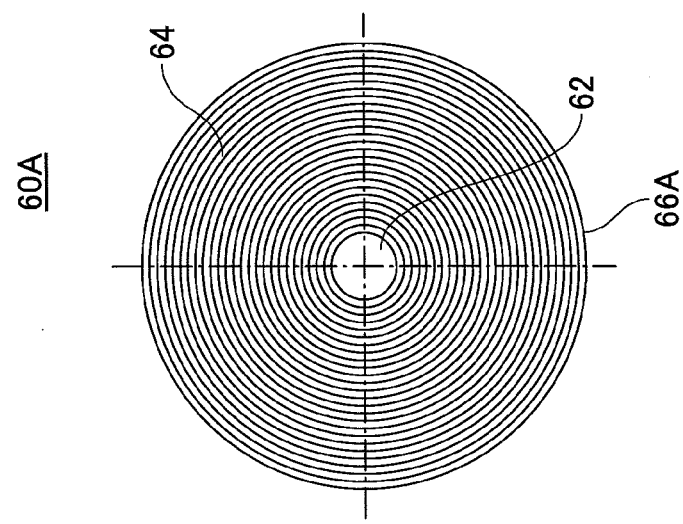
Figure 3:
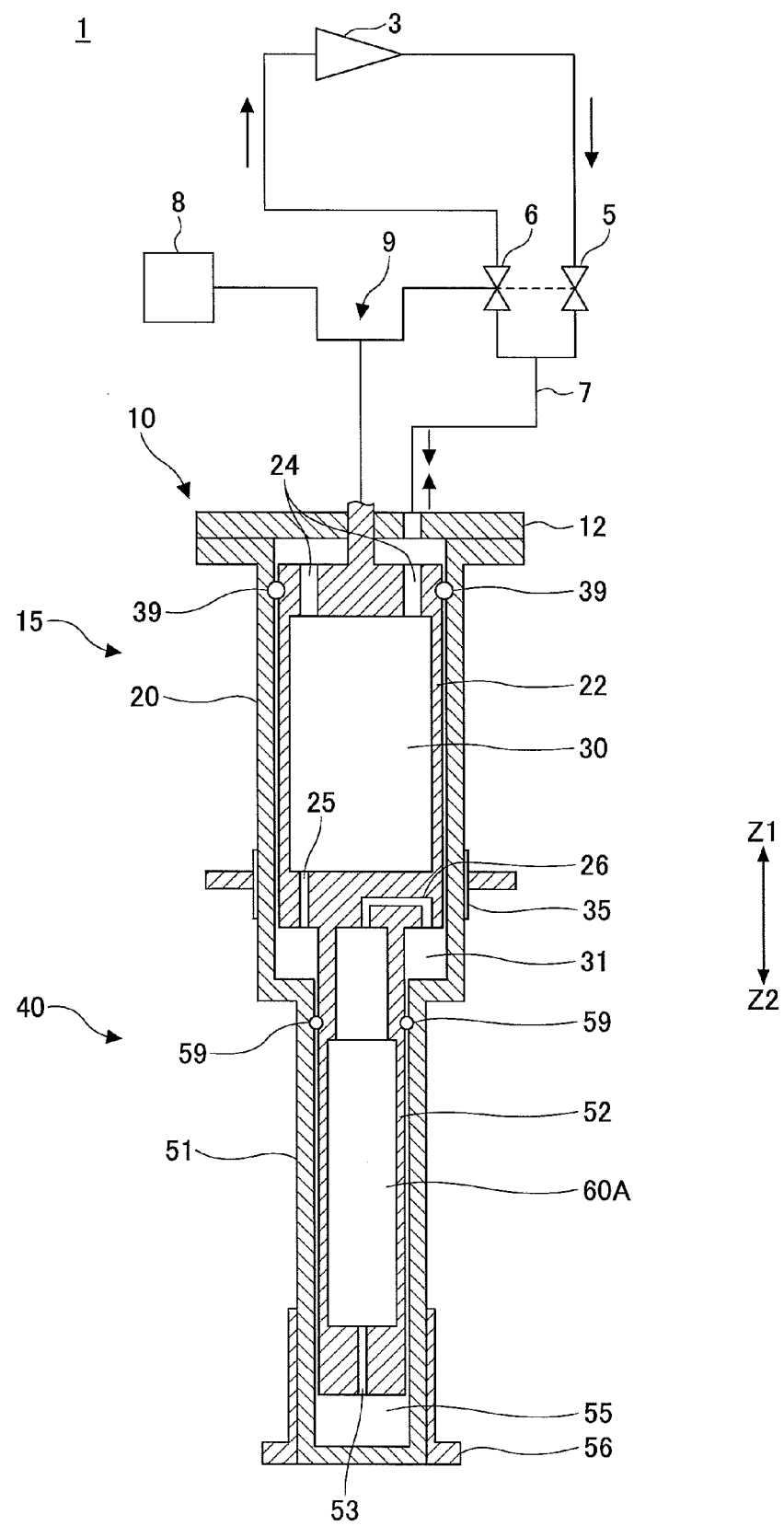
FIG. 3 is a cross-sectional view of a cryocooler that uses a regenerator according to an embodiment of the present invention.

FIGS. 1A-1B illustrate a cryogenic regenerator 60A (simply referred to as "regenerator 60A" hereinafter) according to an embodiment of the present invention. The regenerator 60A may be used in a cryocooler that is capable of producing a cryogenic temperature of less than or equal to 15 K, for example. FIG. 3 illustrates an exemplary cryocooler that uses the regenerator 60A. In FIG. 3, a GM cryocooler 1 is illustrated as the regenerator that is capable of producing a cryogenic temperature of less than or equal to 15 K. However, application of the regenerator 60A of the present embodiment is not limited to the example illustrated in FIG. 3. That is, the regenerator 60A of the present embodiment may be used in various other types of cryocoolers.

In the following, a configuration of the GM cryocooler 1 is described before describing the regenerator 60A. The GM cryocooler 1 includes a gas compressor 3 and a two-stage cold head 10 that acts as a regenerator. The cold head 10 includes a first-stage cooling part 15 and a second-stage cooling part 40. The first-stage and second-stage cooling parts 15 and 40 are connected to each other and are arranged to be coaxial with a flange 12.

The first cooling part 15 includes a hollow first-stage cylinder 20, a first-stage displacer 22 that is arranged to be movable back and forth in axial directions within the first-stage cylinder 20, a first-stage regenerator 30 loaded into the first-stage displacer 22, a first-stage expansion chamber 31 that is arranged within a low temperature end side of the first-stage cylinder 20 (the lower side of the cylinder 20 in FIG. 3) and is configured to change in volume according to the back and forth movement of the first-stage displacer 22, and a first-stage cooling stage 35 arranged near the low temperature end of the first-stage cylinder 20. Further, a first-stage seal 39 is arranged between an inner wall of the first-stage cylinder 20 and an outer wall of the first-stage displacer 22.

A flow path 24 for enabling a refrigerant gas (helium gas) to flow in and out of the first-stage regenerator 30 is arranged at a high temperature end side of the first-stage cylinder 20 (upper side of the first-stage cylinder in FIG. 3). Also, a flow path 25 for enabling the refrigerant gas to flow in and out of the first-stage regenerator 30 and the first-stage expansion chamber 31 is arranged at the low temperature end side of the first-stage cylinder 20.

The second-stage cooling part 40 includes a hollow second-stage cylinder 51, a second-stage displacer 52 that is arranged to be movable back and forth in axial directions within the second-stage cylinder 51, a second-stage regenerator 60A that is loaded into the second-stage displacer 52, a second-stage expansion chamber 55 that is arranged within a low temperature end of the second-stage cylinder 51 and is configured to change in volume according to the back and forth movement of the second-stage displacer 52, and a second-stage cooling stage 56 arranged near the low temperature end of the second-stage cylinder 51.

A second-stage seal 59 is arranged between an inner wall of the second-stage cylinder 51 and the outer wall of the second-stage displacer 52. A flow path 26 for enabling the refrigerant gas to flow in and out of the first-stage regenerator 30 is arranged at a high temperature end side of the second-stage cylinder 51. Also, a flow path 53 for enabling the refrigerant gas to flow in and out of the second-stage expansion chamber 55 is arranged at the low temperature end side of the second-stage cylinder 51.

The gas compressor 3 supplies the refrigerant gas that is suctioned and compressed to a high pressure to the first-stage cooling part 15 via a valve 5 and a pipe 7. Upon discharge, the refrigerant gas that is reduced to a low pressure is discharged from the first-stage cooling part 15 via a valve 5 and a pipe 7 to the gas compressor 3.

The first-stage displacer 22 and the second-stage displacer 52 are moved back and forth by a Scotch yoke mechanism 9 that is connected to a drive motor 8. Also, in conjunction with the back and forth movement of the first-stage displacer 22 and the second-stage displacer 52, the valve 5 and a valve 6 are opened/closed to control the refrigerant gas suction timing.

In the following, operations of the GM cryocooler 1 having the above configuration are described.

It is assumed below that when the valve 5 is open and the valve 6 is open, the first-stage displacer 22 and the second-stage displacer 52 are respectively positioned at the bottom dead points within the first-stage cylinder 20 and the second-stage cylinder 51.

When the valve 5 is open, and the valve 6 is closed, the refrigerant gas at a high pressure flows into the first-stage cooling part 15 from the gas compressor 3. The high pressure refrigerant gas flows from the flow path 24 to the first-stage regenerator 30 and is cooled to a predetermined temperature by a regenerator material of the first-stage regenerator 30. The cooled refrigerant gas then flows from the flow path 25 to the first-stage expansion chamber 31.

A part of the high pressure refrigerant gas that has flown into the first-stage expansion chamber 31 flows into the second-stage regenerator 60A from the flow path 26. The refrigerant gas that has flown into the second-stage regenerator 60A is cooled to an even lower predetermined temperature by a regenerator material of the second-stage regenerator 60A after which the cooled refrigerant gas flows into the second-stage expansion chamber 55 from the flow path 53. As a result, the pressures within the first-stage expansion chamber 31 and the second-stage expansion chamber 55 are raised to a high pressure.

Then, when the first-stage displacer 22 and the second-stage displacer 52 respectively move to the top dead points within the first-stage cylinder 20 and the second-stage cylinder 51, the valve 5 is closed and the valve 6 opens. In turn, the refrigerant gas within the first-stage expansion chamber 31 and the second-stage expansion chamber 55 are adiabatically-expanded to generate cold at the first-stage expansion chamber 31 and the second-stage expansion chamber 55. This in turn causes cooling of the first-stage cooling stage 35 and the second-stage cooling stage 56.

Then, the first-stage displacer 22 and the second-stage displacer 52 are moved toward the bottom dead points. In turn, the refrigerant gas that is reduced to a low pressure flows back to the gas compressor 3 via the valve 6 and the pipe 7 following the reverse route of the above-described flow route while cooling the first-stage regenerator 30 and the second-stage regenerator 60A. Then, the valve 6 is closed.

The above operations may correspond to one cycle of the GM cryocooler 1, and the GM cryocooler 1 may repetitively perform the above operation cycle. In this way, the first-stage cooling stage 35 and the second-stage cooling stage 56 may be cooled so that a cooling object (not shown) that is thermally connected thereto may be cooled.

The regenerator 60A of the present embodiment is arranged within the second-stage displacer 52 of the second-stage cooling part 40. The second-stage displacer 52 of the GM cryocooler 1 may be configured to produce a cryogenic temperature of approximately 4 K, for example. Thus, the temperature of the refrigerant gas flowing within the regenerator 60A may also be less than or equal to 30 K. It is noted that using a regenerator material having a high specific heat (volume specific heat) at this cryogenic temperature of the regenerator 60A may be important in terms of improving the cooling effect.

As the material having a high specific heat under the above cryogenic temperature, use of a magnetic regenerator material such as $HoCu_2$ may be contemplated. However, because a magnetic regenerator material is mainly composed of rare earth materials, such a regenerator material is difficult to obtain and costly.

Figure 4:
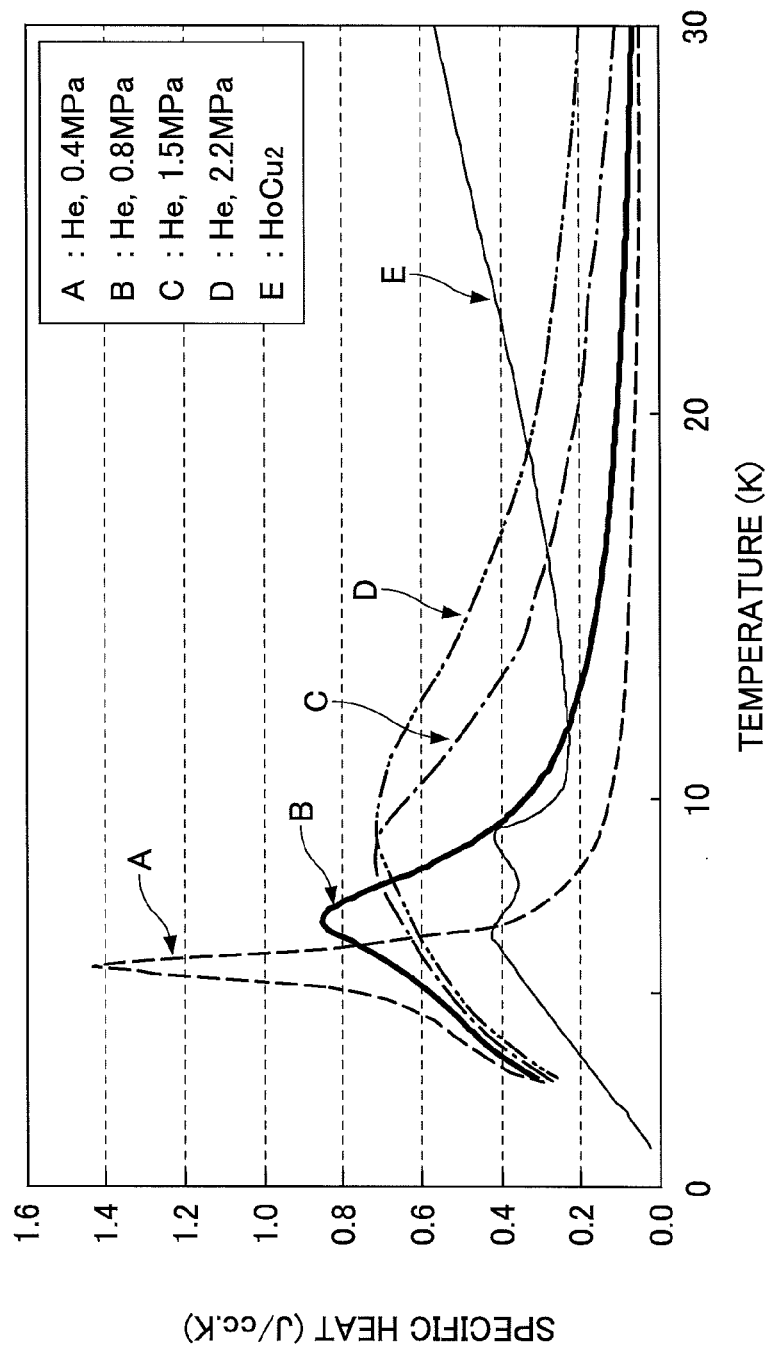
FIG. 4 is a graph illustrating the specific heat of helium gas and the specific heat of $HoCu_2$ in relation to the temperature.

FIG. 4 is a graph illustrating the specific heat of helium gas at different loading pressures and the specific heat of $HoCu_2$ corresponding to a magnetic regenerator material in relation to the temperature. As can be appreciated, in a cryogenic temperature range below approximately 15 K, the specific heat of helium gas is greater than the specific heat of $HoCu_2$. Thus, an efficient cooling effect similar to that obtained in the case of using $HoCu_2$ may be obtained using the helium gas as the regenerator material at a temperature of less than or equal to 15 K.

Referring back to FIGS. 1A-1B, the regenerator 60A of the present embodiment is described below.

The regenerator 60A of the present embodiment is a regenerator that uses helium gas as a regenerator material. The regenerator 60A includes a core material 62, a helium gas sealing tube 64, and a cover member 66A, for example.

The core material 62 is arranged into a cylindrical shape and functions as a core around which the helium gas sealing tube 64 is wound into a coil structure. The core material 62 extends from a high temperature region to a low temperature region of the regenerator 60A. Thus, the core material 62 is preferably made of a material having low thermal conductivity such as a plastic material.

Figure 6:
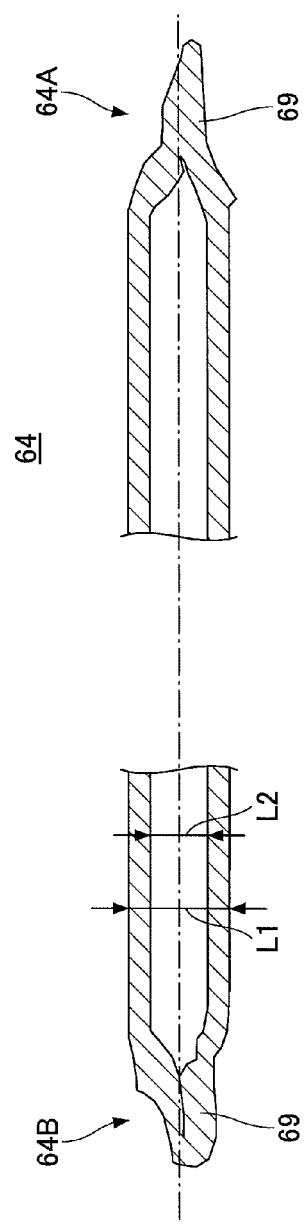
FIG. 6 is an enlarged cross-sectional view of the helium gas sealing tube.

The helium gas sealing tube 64 is a narrow tube into which the helium gas is sealed. FIG. 6 illustrates a front end portion 64A and a rear end portion 64B of the helium gas sealing tube 64. After helium gas is introduced into the helium gas sealing tube 64, the end portions 64A and 64B are crushed and thermally welded to form sealed parts 69. In this way, helium gas may be sealed within the helium gas sealing tube 64.

The helium gas sealing tube 64 is wound around the core material 62 into a coil structure. In the present embodiment, the helium gas sealing tube 64 is wound around the core material 62 approximately 2000 turns. However, the present invention is not limited to this embodiment. In a preferred embodiment, the helium gas sealing tube 64 is wound around the core material 62 at least 1500 turns and no more than 2500 turns.

Figure 2A:
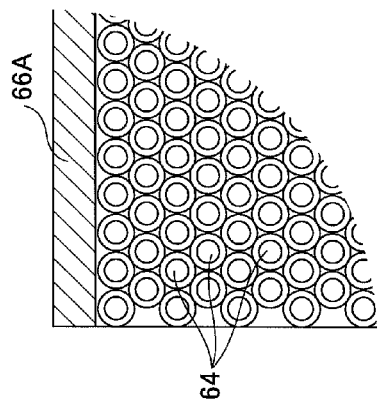
FIGS. 2A-2C are enlarged cross-sectional views illustrating various manners in which a helium gas sealing tube may be wound.
Figure 2B:
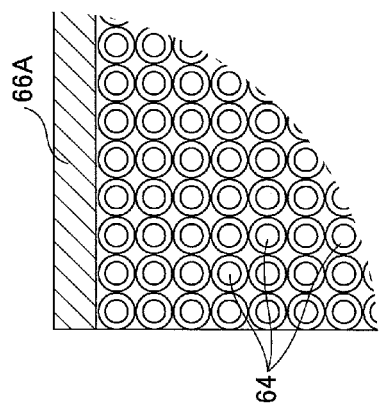

It is noted that the manner of winding the helium gas sealing tube 64 around the core material 62 is not limited to a particular manner. For example, the helium gas sealing tube 64 may be wound to be parallel in both the radial directions and the axial directions as illustrated in FIG. 2A, or the winding pitch of the helium gas sealing tube 64 may be shifted in the radial and axial directions as illustrated in FIG. 2B.

It is noted, however, that because a refrigerant gas flows within the regenerator 60A, the winding density of the helium gas sealing tube 64 is preferably arranged such that sufficient space may be formed between adjacent helium gas sealing tube sections to enable the refrigerant gas to pass and exchange heat with the helium gas sealing tube 64.

Figure 2C:
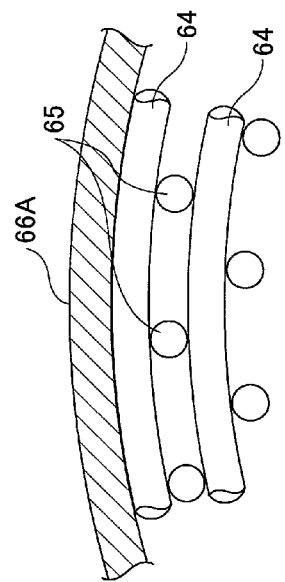

In one embodiment, in order to secure sufficient space between the helium gas sealing tube sections to enable the flow of the refrigerant gas, spacer members 65 may be arranged between the helium gas sealing tube 64 that is wound around the core material 62 as illustrated in FIG. 2C. The spacer member 65 may be a thread made of a material having relatively low thermal conductivity such as Teflon (registered trademark) or nylon (registered trademark), or a metallic thin wire, for example. By arranging such a spacer 65, the refrigerant gas may pass through the space formed by the spacer 65 so that efficient heat exchange may be enabled between the refrigerant gas and the helium gas sealing tube 64.

The helium gas sealing tube 64 is preferably made of a material that has relatively high thermal conductivity and can retain adequate mechanical durability even when it is wound around plural times in the above-described manner. For example, a copper alloy or stainless steel may be used as the material for the helium gas sealing tube 64.

Also, although the outer diameter of the helium gas sealing tube 64 (represented by arrow L1 in FIG. 6) and the inner diameter of the helium gas sealing tube 64 (represented by arrow L2 in FIG. 6) are not particularly limited so long as the above-described characteristics may be realized, it is noted that as the outer and inner diameters become smaller, the ratio of the tube thickness to the inner volume of the helium gas sealing tube 64 increases, which in turn causes a decrease in the cooling capacity. In this respect, the outer diameter L1 is preferably arranged to be at least 0.1 mm and no more than 0.5 mm, and the inner diameter L2 is preferably arranged to be at least 0.05 mm and no more than 0.3 mm.

Further, the helium gas pressure within the helium gas sealing tube 64 is preferably arranged to be at least 0.4 MPa and no more than 2.2 MPa under the temperature range of 3K to 15K (see FIG. 4) in order to achieve desirable cooling efficiency.

The cover member 66A is arranged into a cylindrical shape and may be made of stainless steel, for example. The cover member 66A is configured to cover the outer periphery of the helium gas sealing pipe 64 that is wound around the core material 62.

It is noted that the helium gas sealing pipe 64 having helium gas sealed therein may deform as a result of a change in temperature. The cover member 66A is arranged to prevent such deformation of the helium gas sealing pipe 64 due to temperature change.

According to an aspect of the present embodiment, by using helium gas as a regenerator material, the regenerator 60A having the above configuration may maintain high specific heat even at a cryogenic temperature of no more than 15 K and may enable efficient heat exchange with the refrigerant gas flowing therethrough. That is, the regenerator 60A of the present embodiment may achieve improved cooling efficiency particularly under a cryogenic temperature of no more than 15 K.

Further, by having the helium gas sealed within the helium gas sealing tube 64, the regenerator 60A of the present embodiment does not need to have helium gas supplied thereto from an external source. In this way, the structure of a cryocooler using the regenerator 60A of the present embodiment may be simplified, for example.

It is noted that the regenerator 60A may be loaded in the second-stage displacer 52 (see FIG. 3) alone, or the regenerator 60A may form a unit with (combined with) a regenerator material of some other form. FIGS. 5A-5D illustrate exemplary regenerator units 80A-80D that include the regenerator 60A and some other form of regenerator material.

Each of the regenerator units 80A-80D illustrated in FIGS. 5A-5D is divided into a high temperature side region 82A and a low temperature side region 82B. Specifically, in FIGS. 5A-5D, the right side region corresponds to the high temperature side region 82A and the left side region corresponds to the low temperature side region 82B.

Figure 5A:
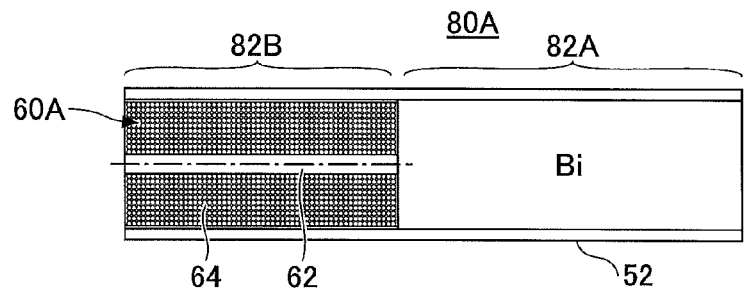
FIGS. 5A-5D are diagrams illustrating regenerator units that include a regenerator according to an embodiment of the present invention.

In the regenerator unit 80A illustrated in FIG. 5A, bismuth (Bi) particles, which have a higher specific heat peak temperature than helium gas, are loaded in the high temperature side region 82A, and the regenerator 60A is arranged at the low temperature side region 82B.

Figure 5B:
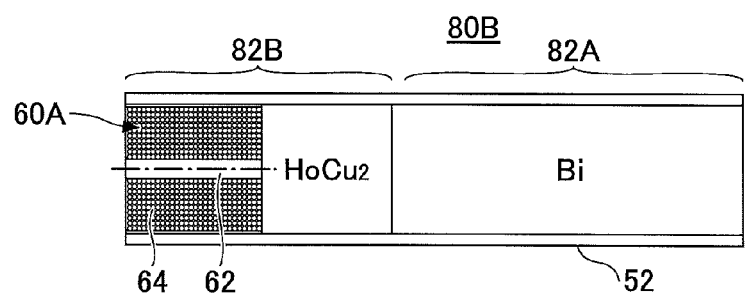

In the regenerator unit 80B illustrated in FIG. 5B, Bi particles are loaded in the high temperature side region 82A, and $HoCu_2$ corresponding to a magnetic regenerator material and the regenerator 60A are arranged at the low temperature side region 82B. As can be appreciated from FIG. 4, the specific heat of helium gas is greater than the specific heat of $HoCu_2$ at a temperature of 10 K or lower. Thus, in FIG. 5B, the regenerator 60A is arranged at the lower temperature side of the low temperature side region 82B, and the $HoCu_2$ is arranged at the higher temperature side of the low temperature side region 82B.

Figure 5C:
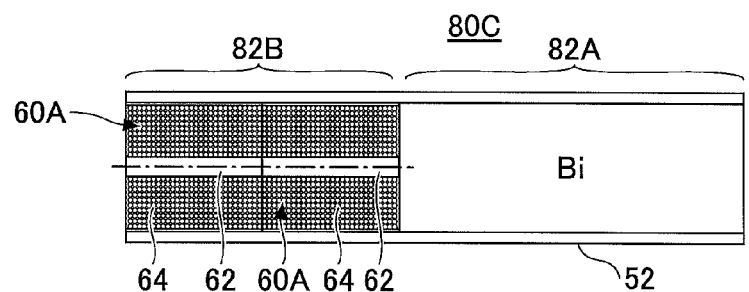

In the regenerator unit 80C illustrated in FIG. 5C, Bi particles are loaded in the high temperature side region 82A, and two regenerators 60A are serially connected at the low temperature side region 82B. As can be appreciated from FIG. 4, at a temperature below 10 K, the specific heat of helium gas at a relatively low pressure is relatively higher. On the other hand, at a temperature range above 10 K, the specific heat of helium gas at a relatively high pressure is relatively higher. Thus, in FIG. 5C, the two regenerators 60A having helium gas sealed at differing sealing pressures are serially connected so that the regenerator 60A with the suitable sealing pressure may be used according to the normal operating temperature of the cryocooler, for example.

Figure 5D:
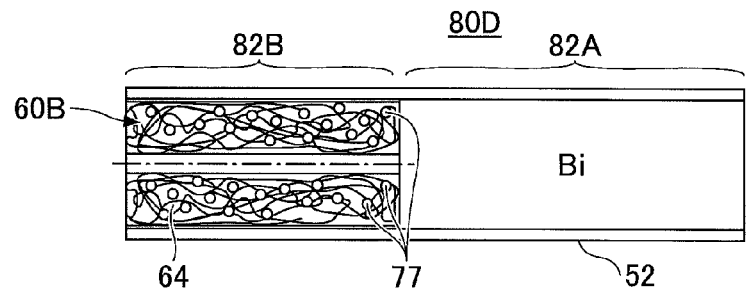

The regenerator unit 80D illustrated in FIG. 5D has a regenerator 60B, which is a modified embodiment of the regenerator 60A of FIG. 1, arranged at the low temperature side region 82B. The regenerator 60B of the modified embodiment has a magnetic regenerator material 77 such as $HoCu_2$ scattered between the helium gas sealing tube 64 so that a relatively large space may be formed between the helium gas sealing tube 64 that is wound around the core material 62.

By arranging a regenerator material with a relatively high specific heat peak temperature at the high temperature side region 82A and arranging a regenerator material with a relatively low specific heat peak temperature at the low temperature side region 82B, the regenerator units 80A-80D may enable efficient cooling, for example.

It is noted that the regenerator units 80A-80D having the regenerator 60A/60B and Bi particles loaded in the second-stage displacer 52 have been contemplated for implementation in GM cryocoolers. In the case of using the regenerator 60A/60B in pulse tube cryocoolers, the regenerator 60A/60B may be loaded in a regenerator housing, for example. Also, in certain preferred embodiments, the regenerator units 80A-80D may be arranged into regenerator material cartridges that are arranged to be detachable from the cryocooler.

In the following, a method of manufacturing the regenerator 60A is described with reference to FIGS. 7-10.

Figure 7:
FIG. 7 illustrates a process of manufacturing the regenerator.

To manufacture the regenerator 60A of the present embodiment, first the core material 62 is prepared as illustrated in FIG. 7. As described above, the core material 62 is a cylindrical member. In one preferred embodiment, the core material 62 may have flanges arranged at both ends in order to facilitate a process of arranging the helium gas sealing tube 64, which is described in detail below.

The core material 62 is configured to have the helium gas sealing tube 64 wound thereon. At the time the helium gas sealing tube 64 is wound around the core material 62, the front end portion 64A and the rear end portion 64B are still open and are filled with air.

Figure 8B:
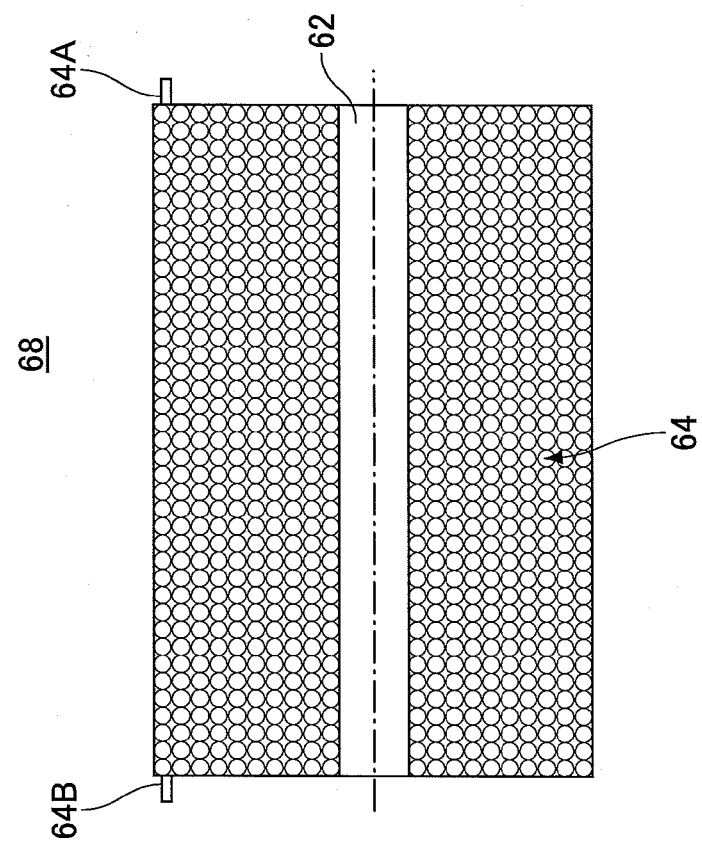
FIGS. 8A-8B illustrate a process of manufacturing the regenerator.
Figure 8A:
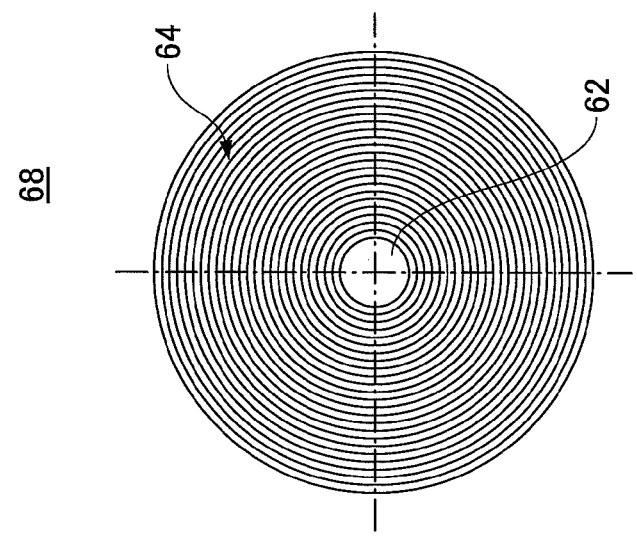

FIGS. 8A-8B illustrate a state where the helium gas sealing tube 64 is wound around the core material 62. In the following descriptions, the structure formed by winding the helium gas sealing tube 64 around the core material 62 where the helium gas sealing tube 64 does not yet have helium gas sealed therein is referred to as "helium gas sealing tube wound structure 68." The front end portion 64A and the rear end portion 64B of the helium gas sealing tube 64 protrude outward from the respective ends of the helium gas sealing tube wound structure 68.

Figure 9:
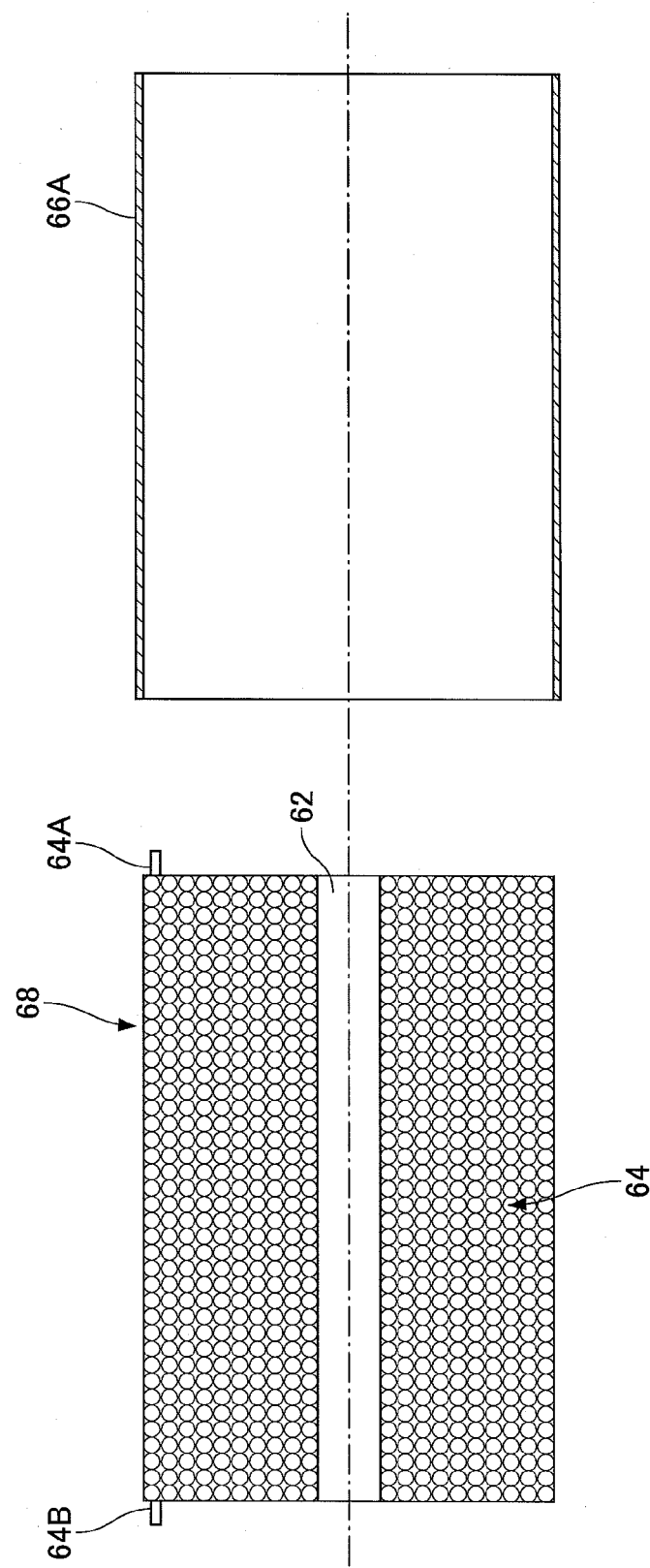
FIG. 9 illustrates a process of manufacturing the regenerator.

Referring to FIG. 9, after the helium gas sealing tube wound structure 68 is fabricated, the cover member 66A that covers the outer periphery of the helium gas sealing tube 64 that is wound around the core material 62 is arranged over the helium gas sealing tube wound structure 68. At the time the cover member 66A is arranged over the helium gas sealing tube wound structure 68, helium gas is not yet filled into the helium gas sealing tube 64. Thus, the helium gas sealing tube 64 is not deformed (expanded) and the cover 66A may be easily arranged over the helium gas sealing tube wound structure 68.

Figure 10:
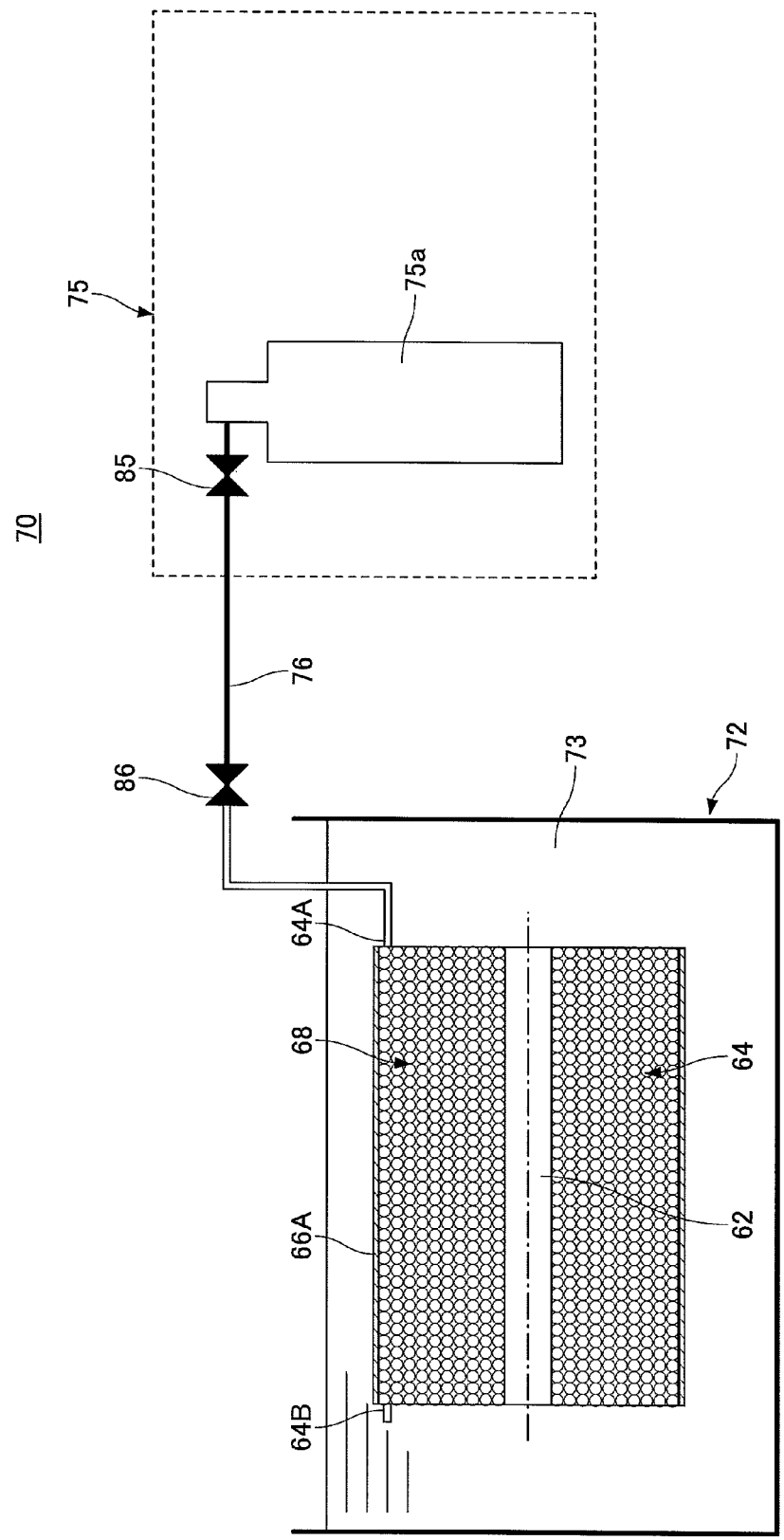
FIG. 10 illustrates a process of manufacturing the regenerator.

After the cover member 66A is arranged over the helium gas sealing tube wound structure 68, a process of filling helium gas into the helium gas sealing tube 64 is performed. FIG. 10 illustrates the process of filling the helium gas sealing tube 64 with helium gas.

To fill the helium gas sealing tube 64 with helium gas, a liquid nitrogen container 72 (corresponding to an embodiment of a cooling machine) and a gas supplying device 75 (corresponding to an embodiment of a helium gas supplying unit) are used.

The liquid nitrogen container 72 contains liquid nitrogen 73 and is configured such that the helium gas sealing tube wound structure 68 may be immersed in the liquid nitrogen contained therein. The gas supplying device 75 uses a helium gas cylinder 75a in the present embodiment. However, in other embodiments, a high pressure compressor that is capable of compressing helium gas may be used, for example.

To fill the helium gas sealing tube 64 with helium gas, first, a gas supplying tube 76 that is connected to the gas supplying device 75 is connected to the front end portion 64A of the helium gas sealing tube 64. At this point, valves 85 and 86 arranged at the gas supplying tube 76 are closed, and the supply of helium gas from the helium gas cylinder 75a is put on hold.

After connecting the front end portion 64A to the gas supplying tube 76, the valves 85 and 86 are opened so that helium gas is supplied from the gas supplying device 75 to the helium gas sealing tube 64. In this way, the air filled within the helium gas sealing tube 64 is gradually replaced by helium gas. It is noted that the air within the helium gas sealing tube 64 that is replaced by the helium gas is discharged from the rear end portion 64B.

After the air within the helium gas sealing tube 64 is replaced by helium gas, a process of crushing the end portion 64B using a jig is performed. In this way, the end portion 64B may be hermetically sealed (provisionally). As described above, because the helium gas sealing tube 64 is a relatively thin tube with a diameter of 0.5 mm or smaller, the process of crushing the rear end portion 64B may be easily performed.

It may be determined whether the rear end portion 64B has been hermetically sealed by checking to see whether air bubbles are generated from the rear end portion 64B when the helium gas sealing tube wound structure 68 is immersed in the liquid nitrogen 73.

Then, as illustrated in FIG. 10, the helium gas sealing tube wound structure 68 is immersed in the liquid nitrogen 73 contained in the liquid nitrogen container 72. In this way, the helium gas sealing tube wound structure 68 may be cooled down to about 77 K.

Further, by continuing the supply of helium gas to the helium gas sealing tube 64 from the gas supplying device 75 with the rear end portion 64B being sealed, the pressure within the helium gas sealing tube 64 gradually increases. Then, when the helium gas pressure within the helium gas sealing tube 64 reaches a predetermined pressure, the valves 85 and 86 are closed and the supply of helium gas from the gas supplying device 75 to the helium gas sealing tube 64 is stopped.

It is noted that the process of crushing the rear end portion 64B may be alternatively be performed after the helium gas sealing tube wound structure 68 is cooled. However, in such a case, it may take longer to replace the air within the helium gas sealing tube with helium gas. Accordingly, the process of crushing the rear end portion is preferably performed at room temperature before the helium gas sealing tube 64 is cooled.

Next, the front end portion 64A of the helium gas sealing tube 64 protruding outward from the liquid nitrogen container 72 is crushed using a jig, and the front end portion 64A is disconnected from the gas supplying tube 76. In this way, the front end portion 64A may also be hermetically sealed (provisionally).

Next, the helium gas sealing tube wound structure 68 is removed from the liquid nitrogen container 72. Then, a thermal welding process is performed on the front end portion 64A and the rear end portion 64B that are provisionally sealed. In this way, the front end portion 64A and the rear end portion 64B may be securely sealed so that helium gas may be securely sealed within the helium gas sealing tube 64. In one embodiment, the front end portion 64A and the rear end portion 64B may be wound around the core material 62 after they are sealed. By performing the above-described processes, the regenerator 60A of the present embodiment may be manufactured.

According to an aspect of the present embodiment, the helium gas sealing tube wound structure 68 is immersed in liquid nitrogen 73 to cool the helium gas sealing tube 64 and helium gas is filled into the cooled helium gas sealing tube 64 to manufacture the regenerator 60A. In a case where helium gas is filled into the helium gas sealing tube 64 at room temperature, the helium gas may have to be filled at a relatively high pressure. However, by cooling the helium gas sealing tube 64 and filling the helium gas into the cooled helium gas sealing tube 64, the helium gas may be filled at a lower filling pressure.

Specifically, the pressure required for filling helium gas into the helium gas sealing tube 64 at room temperature is approximately 60 MPa. However, by using the method of manufacturing the regenerator 60A according to the present embodiment, a high output high pressure compressor may not have to be used, and helium gas may be easily filled into the helium gas sealing tube 64.

While certain preferred embodiments of the present invention have been described above, the present invention is not limited to these embodiments, and various changes and modifications may be made without departing from the scope of the present invention.

For example, although liquid nitrogen is used to cool the helium gas sealing tube wound structure 68 in the above-described embodiments, a cooling machine may alternatively be used to cool the helium gas sealing tube wound structure 68.

Also, although the helium gas sealing tube 64 is wound around the core material 62 to manufacture the regenerator 60A in the above-described embodiments, the helium gas sealing tube 64 does not necessarily have to be wound around the core material 62, and in other embodiments, the helium gas sealing tube 64 may be randomly arranged within the second-stage displacer 52 without using the core material 62, for example.

Further, embodiments of the present invention may be applied not only to GM cryocoolers but also to other types of cryocoolers such as pulse tube cryocoolers.

What is claimed is:

1. A method of manufacturing a cryogenic regenerator, comprising:
    replacing air within a helium gas sealing tube having a front end portion and a rear end portion that are open by supplying helium gas through the front end portion and exhausting the air from the rear end portion before sealing the rear end portion;
    sealing the rear end portion of the helium gas sealing tube after replacing the air;
    cooling the helium gas sealing tube after sealing the rear end portion and filling additional helium gas into the cooled helium gas sealing tube through the front end portion from a helium gas supplying unit;
    sealing the front end portion of the helium gas sealing tube after the helium gas sealing tube is filled with the additional helium gas; and
    fabricating a helium gas sealing tube wound structure by winding the helium gas sealing tube into a coil structure around a core material,
    wherein the helium gas sealing tube is a metallic tube,
    wherein the step of sealing the rear end portion of the helium gas sealing tube includes crushing and hermetically sealing the rear end portion of the helium gas sealing tube, and
    wherein the step of sealing the front end portion of the helium gas sealing tube includes crushing and hermetically sealing the front end portion of the helium gas sealing tube.

2. The method of manufacturing the cryogenic regenerator as claimed in claim 1,
    wherein the step of fabricating the helium gas sealing tube wound structure is performed before supplying the helium gas to the helium gas sealing tube.

3. The method of manufacturing the cryogenic regenerator as claimed in claim 1, wherein
    the step of hermetically sealing the rear end portion of the helium gas sealing tube includes thermally welding the rear end portion of the helium gas sealing tube; and
    the step of hermetically sealing the front end portion of the helium gas sealing tube includes thermally welding the front end portion of the helium gas sealing tube.

* * * * *